(No Model.) 3 Sheets—Sheet 1.

T. PRICE.
MACHINE FOR TRIMMING WALL PAPER.

No. 556,369. Patented Mar. 17, 1896.

WITNESSES:
A. E. Dieterich
J. F. Shepard

INVENTOR
Twiggs Price,
BY J. R. Littell,
his ATTORNEY.

(No Model.) 3 Sheets—Sheet 2.
T. PRICE
MACHINE FOR TRIMMING WALL PAPER.
No. 556,369. Patented Mar. 17, 1896.
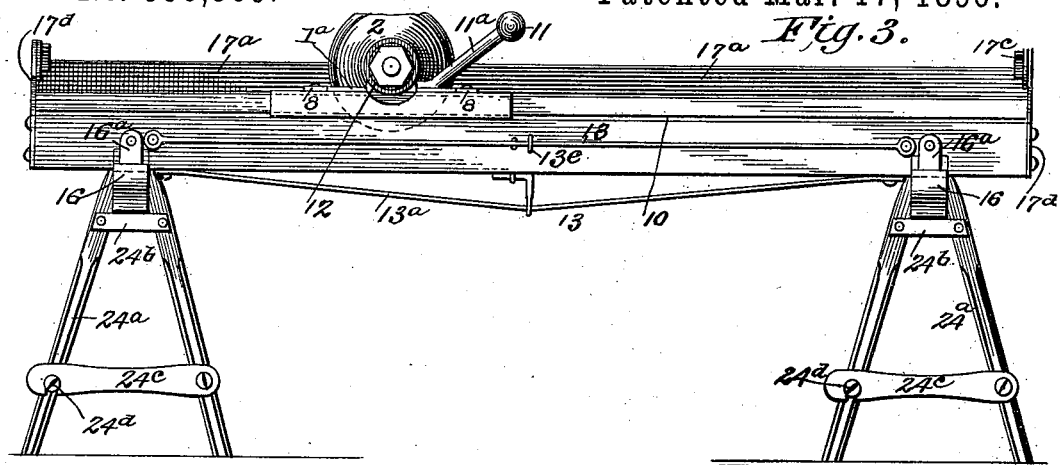
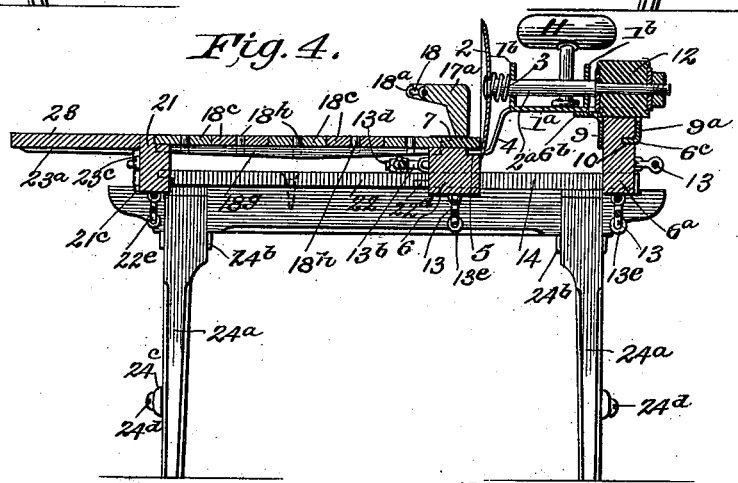
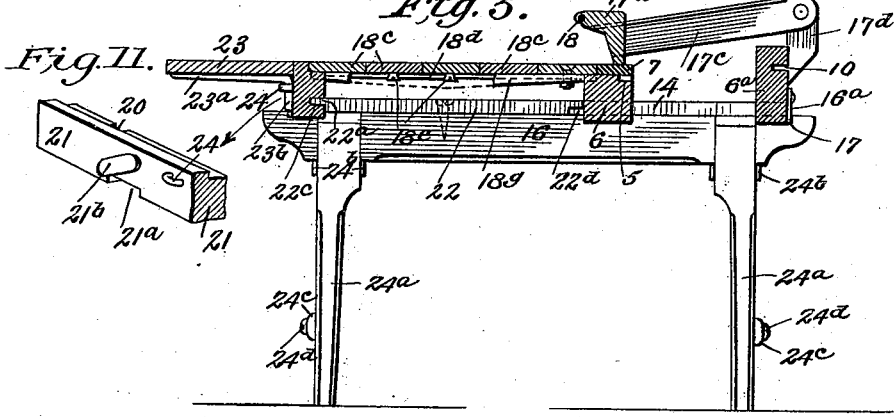
WITNESSES:
A. E. Dieterich
N. O. Shepard
INVENTOR
Twiggs Price,
BY J. R. Littell,
his ATTORNEY.

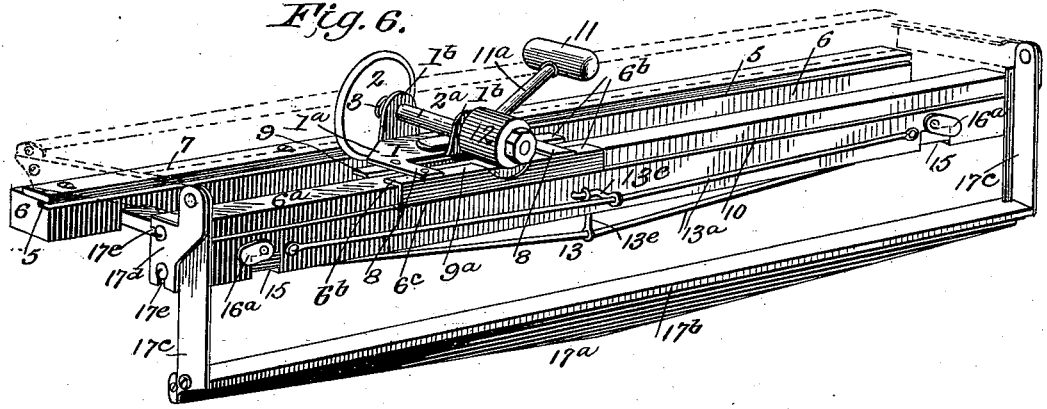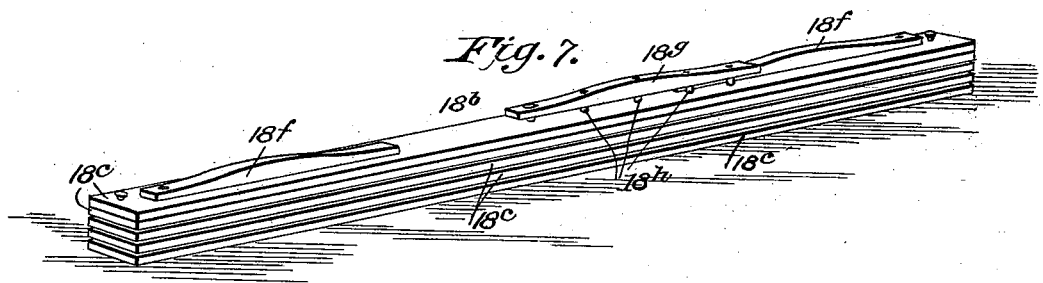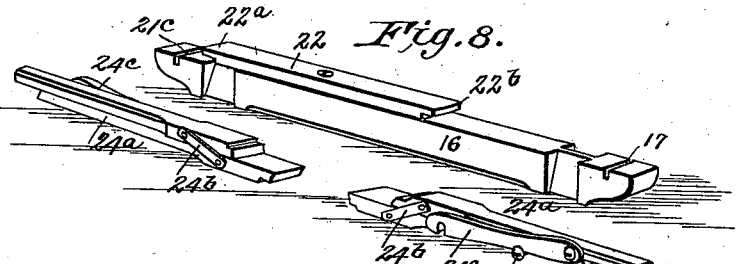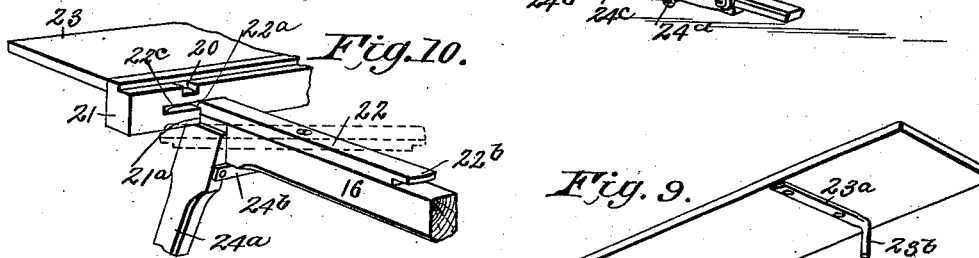

UNITED STATES PATENT OFFICE.

TWIGGS PRICE, OF UPPER SANDUSKY, ASSIGNOR OF ONE-HALF TO R. A. BEVER, OF NEVADA, OHIO.

MACHINE FOR TRIMMING WALL-PAPER.

SPECIFICATION forming part of Letters Patent No. 556,369, dated March 17, 1896.

Application filed October 29, 1894. Serial No. 527,371. (No model.)

*To all whom it may concern:*

Be it known that I, TWIGGS PRICE, a citizen of the United States, residing at Upper Sandusky, in the county of Wyandot and State of Ohio, have invented certain new and useful Improvements in Machines for Cutting and Trimming Wall-Paper or the Like; and I do hereby declare that the following is a full, clear, and exact description of the invention, which will enable others skilled in the art to which it appertains to make and use the same.

My invention has special relation to improvements in wall-paper-hangers' machines designed for trimming or cutting wall-paper, pasted or unpasted, and is equally adapted for cutting leather, cardboard, &c.

My improvements combine a work-table and trestles, adapted to be conveniently taken apart and compactly folded for carrying, and a cutter proper which can be readily separated from the table and used independently thereof, if desired.

To these ends my invention consists of a rotary, dished or concaved cutter, whose cylindrical spring-encircled shaft is borne on a carriage adapted to travel between and upon ways, said cutter acting in conjunction with a straight-edge, and its shaft having a roller or cog-wheel bearing to transmit the rotary cutting motion thereto while the carriage is propelled by hand.

The invention further consists of certain improvements in the construction and arrangement of a hinged presser-bar adapted to rest upon the paper or stock being cut and capable of being readily shifted or swung out of the way and held conveniently suspended when not in use.

Figure 1:
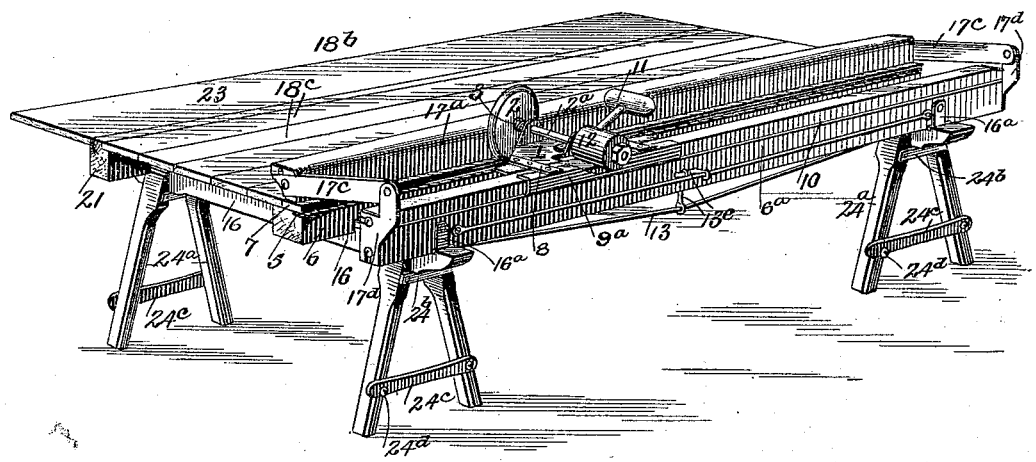
Figure 2:
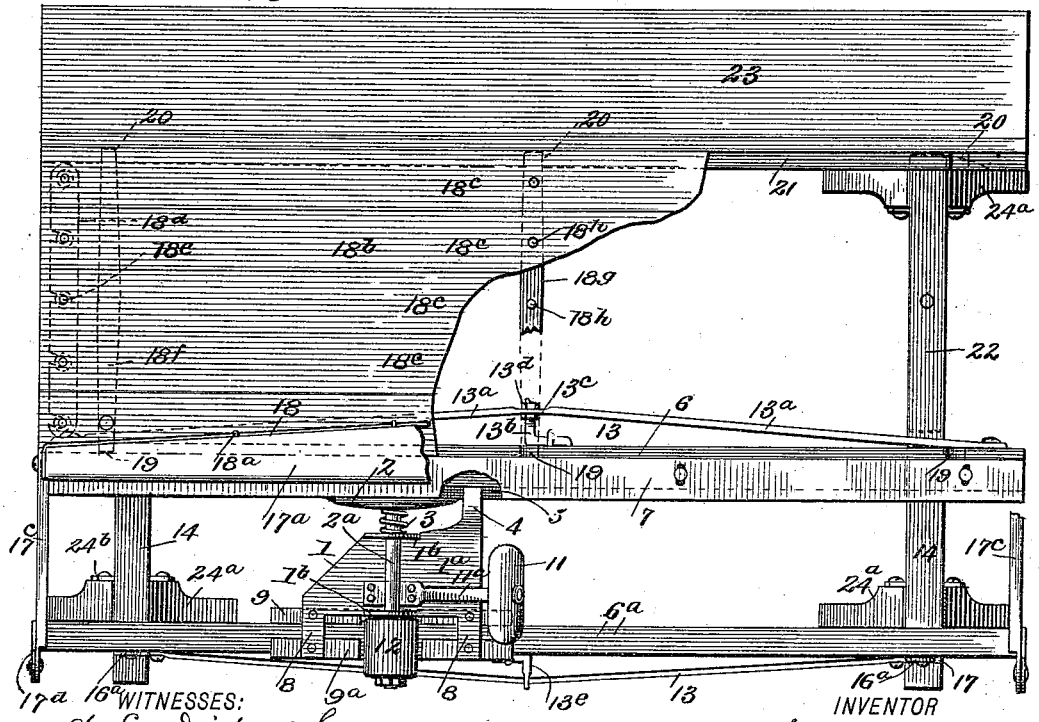

In the accompanying drawings, Figure 1 is a perspective view of my invention. Fig. 2 is a broken plan view. Fig. 3 is a front elevation. Fig. 4 is a cross-section passing through the cutter-carriage. Fig. 5 is a similar section in alignment with one of the trestles. Fig. 6 is a perspective view showing the cutter-carriage with its guideways and attached presser-bar disassembled and separated from the table and trestles. Fig. 7 is a perspective view showing the table in its knockdown form. Fig. 8 is a similar view of one of the trestles in its knockdown form or folded. Fig. 9 is a detached view in perspective of the table leaf or extension. Fig. 10 is a detail perspective view illustrating the engagement of the pivoted button-pieces upon the trestles. Fig. 11 is a detail perspective view illustrating the longitudinal side piece which rests upon the trestles at their rear ends.

The carriage 1 bearing the cutter 2 is preferably composed of a flat or plate-like portion $1^a$, having opposite upturned and apertured supports $1^b$, through which passes the cylindric shaft $2^a$ of said cutter fixed to one end of said shaft. Between said cutter and the contiguous shaft-support is interposed a spring 3, the pressure of which holds the cutter forcibly against the straight-edge hereinafter referred to.

The plate-like portion $1^a$ of the carriage 1 has preferably depending from one side, at the rear end, a downward and outward projecting arm 4 extending into a longitudinal groove 5, formed preferably by reducing the inner upper longitudinal edge of the rear guideway, 6, and the straight-edge 7 secured upon the latter and overhanging said reduction, as shown. The opposite side of the plate-like portion $1^a$ of the carriage 1 has secured to it in any suitable way, but in the present instance by additional arms 8, parallel longitudinal guides or plates 9 $9^a$ closely fitting the front guideway, $6^a$, with their upper edges bent down laterally, as at $6^b$, affording a convenient means for the attachment thereto of said additional arms 8. One of said upper laterally-bent edges rests upon said front guideway, $6^a$. The front or same guide having the last-referred-to upper laterally-bent edge is also bent laterally at its lower edge, as at $6^c$, and extends into a coincident longitudinal groove 10, preferably formed by reducing the outer upper longitudinal edge of the lower one of the two sections or pieces of which said guideway is preferably constructed, as shown, the cutter-carriage thus being held thereon against accidental upward displacement.

To the plate-like portion $1^a$ of the carriage 1 is also attached the upward and rearward inclined cylindric or shank portion $11^a$ of a handle 11, itself preferably made of wood and shaped to be conveniently grasped by the hand for propelling the carriage with its cutter in cutting or trimming the paper, leather, cardboard, or other substance it is desired to operate upon.

Upon the front or outer end of the cutter arbor or shaft $2^a$ is secured, between and by means of a disk and nut in the present instance, an elastic or rubber traction-roller 12, traveling on the guideway or rail $6^a$ to impart a rotary motion to the cutter as the carriage is propelled by hand. The roller being of much less diameter than the cutter, as is herein shown to be the case, a greatly-increased rotation will be imparted to the cutter and thus accordingly promote the efficiency of its cutting action. In lieu of the elastic roller 12, when heavier work may be required, may be used a cogged wheel to increase the traction.

The guideways 6 $6^a$ are strengthened or armed with truss-braces 13 13 applied to their outer and lower sides, the same consisting of rods $13^a$, sprung from near the ends of the guideways and tensioned or bowed about midway their lengths, in one instance by a bent screw-threaded bolt $13^b$ projecting from said guideways through an eye in a central flattened portion $13^c$ of the rod and having fitted thereon at each side of said flattened portion a jam-nut $13^d$. In the other instances the rods or braces are simply passed where they are bowed or tensioned through eyes of bent stays $13^e$ projecting from the guideways.

The guideways are connected by crosspieces 14 near their ends, let up into mortises formed therein to provide below said crosspieces recesses 15, which receive the top bars or pieces of the trestles 16 and thus permit of the seating of the same thereon. Pivoted to the outer side of one of the guideways 6 $6^a$, adjacently to the mortises or recesses 15, are cam-fastenings $16^a$, engaging transverse slits 17 in the top pieces of the trestles to prevent accidental sidewise displacement of the frame thus formed by the guideways and their connecting-pieces.

The presser-bar $17^a$ consists in the main of a bar $17^b$ having a lower narrow flat edge to engage or press and hold the paper or material while being operated on and a centrally-broadened upper portion to provide ample resting-surface for the hand to rest or press on. The bar $17^b$ may be reinforced around the outer upper edge of its broadened portion by a metal piece or wire 18 passed through and held firmly to the same by staples or eyes $18^a$ driven or sunk into the bar and having its ends widened or flattened and screwed to the ends of the bar.

To the ends of the bar $17^b$ are screwed or otherwise fastened, preferably plate-like arms $17^c$ for lightness, with upper inturned edges pivoted or hinged to the offset, upward-projecting portions of plates $17^d$, suitably fastened to the ends of the front guideway $6^a$, the screws (such by preference being used) serving as the fastenings for that purpose preferably passing through slots $17^e$ in said plates opening respectively laterally and downward.

The straight-edge 7 is in practice made adjustable to keep it true relatively to the cutter, and the cutter, in addition to being disk-shaped, is concaved or dished to render it self-sharpening and to promote its durability.

The work-table $18^b$ is composed of a series of slats $18^c$ individually removable, one slat having pivoted to its under side serially-notched cross pieces or bars $18^d$, with which are adapted to engage two studs $18^e$ on each of the other slats, thus holding the same assembled. In order to firmly brace or stay the slats as assembled additional cross-pieces $18^f$ and $18^g$ are each pivoted at one end to one slat at suitable intervals apart, the two end ones, $18^f$, having no other connection therewith, but the middle stay or cross-piece, $18^g$, has also a connection with each of the other slats through a series of studs $18^h$ projecting therefrom and entering corresponding apertures in said slats.

The table $18^b$ when in position has the ends of its cross-pieces $18^f$ $18^g$ resting in mortises 19 and 20, the former being formed in the rear or inner guideway, 6, and the latter being produced in the top rabbeted surface (see Fig. 11) of an additional longitudinal side piece 21 resting upon the trestles at their rear ends. The side piece 21 has also mortises or recesses $21^a$ in its under side, which coincide with and receive the top pieces of the trestles, and is also provided with pivoted cam-fastenings $21^b$ engaging slits $21^c$ in said top pieces of the trestles to prevent the accidental displacement thereof in one direction. To hold said side pieces as against like displacement in the opposite direction and in the upward direction, button-pieces 22 are pivoted upon the top pieces of the trestles, having their ends provided with tongues $22^a$ $22^b$, engaging mortises $22^c$ in the inner ends of the side pieces and lapping corresponding tongues $22^d$ on the cross-pieces 14 of guideways, respectively. The side piece 21 is also strengthened or armed by truss braces or rods $22^e$, similar to those previously described.

23 designates a leaf or extension for the table, having secured to its under side straps $23^a$, terminating in downwardly-projecting studs or pintles $23^b$, engaging staples or eyes 24, projecting from the outer side of the side piece 21, permitting the ready removal of said leaf. The leaf also rests about at its center upon a cleat or bracket $23^c$ projecting from the side piece 21.

The trestles are produced in the knockdown form, the legs $24^a$ being connected by parallel straps $24^b$, pivoted thereto near their upper ends, the extreme upper ends of said legs being chamfered to abut and receive the top piece of the trestle between them, with the legs held spread apart by cross-pieces 24°, each pivoted at one end to one leg and engaging at its other end a stud or screw 24ᵈ on the opposite end.

It is apparent from what has been above disclosed that the cutter, with its adjunctive parts, can be used independently of the table, if desired, while all the parts can be readily taken apart and compactly folded for convenience in carrying and be as readily assembled for use. The invention, it is also observed, combines with a wall-paper cutting or trimming machine a table and trestle support therefor for paper-hangers' or other use.

Having thus fully described my invention, what I claim, and desire to secure by Letters Patent, is—

1. The combination, with guideways and a straight-edge applied to one of the same, of a concaved or dished rotary cutter or disk, a carriage bearing the shaft carrying said cutter and having means for its propulsion by hand and a roller or wheel fixed to said shaft and traveling on said guideway, said carriage having at one side an arm engaging a longitudinal slot or groove in one guideway and at its other side a guide formed of parallel plates fitting closely the other guideway, and one of said plates having its lower edge engaging a longitudinal groove in the side of said guideway, substantially as set forth.

2. The combination, with the guideways, the inner one of which carries a straight-edge, of a presser-bar having a hinged connection with the outer guideway and adapted to be swung from and to said straight-edge, and a cutter operating with relation to said straight-edge and carried by a carriage mounted and traveling upon said inner and outer guideways, substantially as and for the purpose set forth.

3. The combination, with the guideways and the straight-edge carried by the inner guideway, and the cutter operating with relation to said straight-edge, and carried by the carriage traveling upon the guideways of the herein-described presser-bar carried by the plates or arms 17°, the latter having a pivotal or hinged connection with the outer guideway, whereby the presser-bar is adapted to be swung over, substantially as and for the purpose set forth.

4. An improved cutting-machine of the class described, comprising the guideways, the straight-edge carried by the inner guideway, the rotary cutter, the carriage bearing the shaft carrying said cutter, the traction roller or wheel secured upon the cutter-shaft and having a bearing-contact upon the outer guideway, guide-plates projecting from said carriage and respectively engaging the guideways, and the hinged swinging presser-bar having a pivotal or hinged connection with the outer guideway and adapted to swing over with relation to the straight-edge upon the inner guideway, substantially as set forth.

5. In a paper-hanger's machine, the carriage-supporting frame having its longitudinal bars provided with aligning mortises or recesses below the connecting-bars thereof, and cam-fastenings, in combination with trestles or supports having in their top pieces, fitting in said mortises, transverse slits engaged by said fastenings, and button-pieces pivoted on said top pieces of the trestles and having tongues engaging or lapping corresponding tongues on said cross-pieces of the carriage-supporting frame, substantially as set forth.

6. In a paper-hanger's machine, the combination of the carriage-supporting frame; trestles having transverse slits and button-pieces; a side piece having cam-fastenings engaging said slits and mortises in its under side, receiving the top pieces of the trestles, and mortises in its inner side engaged by said button-pieces; and a table having underneath cross-pieces engaging mortises in the upper rabbeted surface of said side piece; substantially as set forth.

In testimony whereof I affix my signature in presence of two witnesses.

TWIGGS PRICE.

Witnesses:
SIMEON INMAN,
FRED H. INMAN.